Nov. 12, 1957  A. F. KAY ET AL  2,813,266
INDICATOR DEVICE AND MEANS FOR MOUNTING
Filed Jan. 9, 1956  2 Sheets-Sheet 1
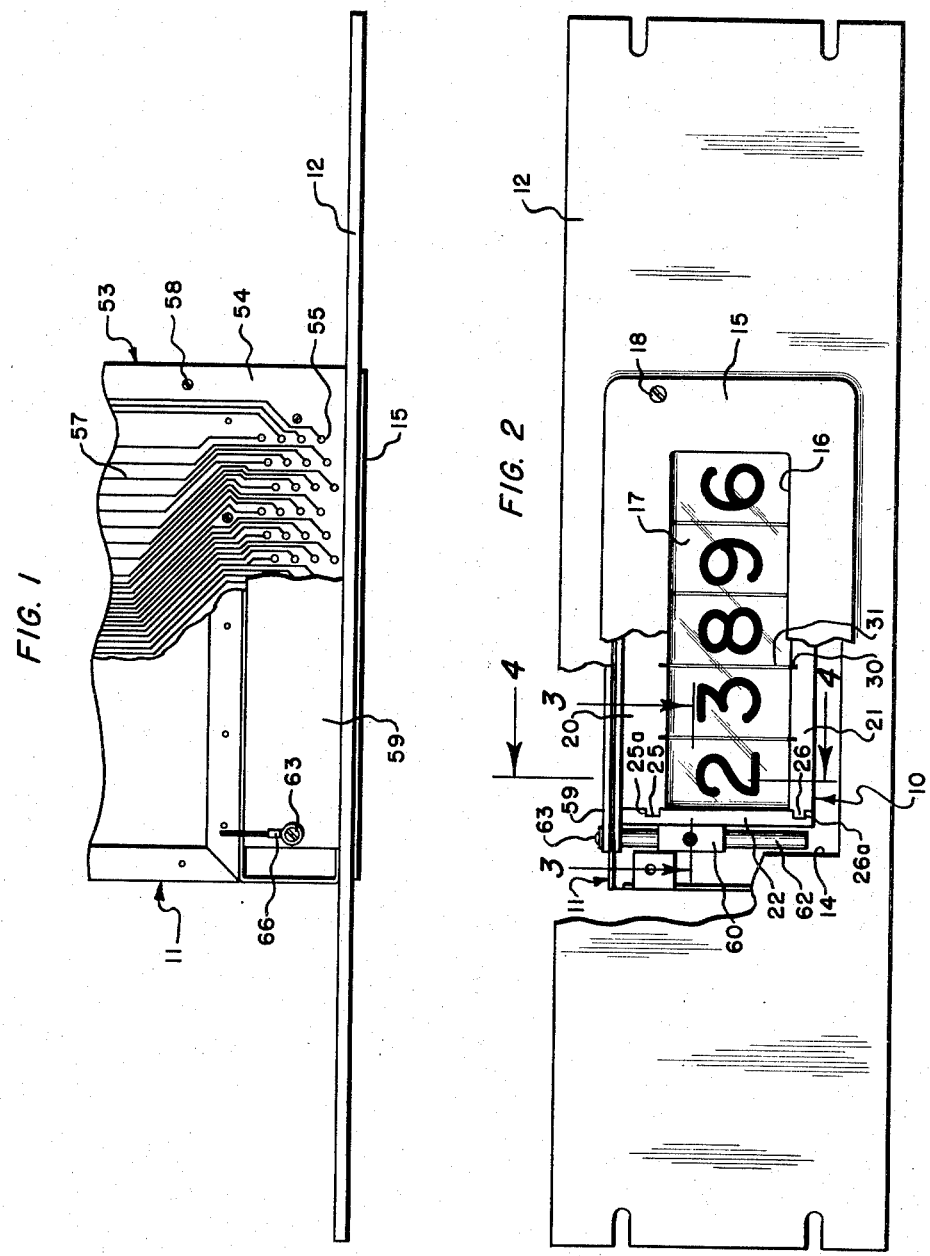
INVENTORS
ANDREW F. KAY
LEONARD M. SCHOLL
COVERT B. MEREDITH
BY
ATTORNEY Nov. 12, 1957  A. F. KAY ET AL  2,813,266
INDICATOR DEVICE AND MEANS FOR MOUNTING
Filed Jan. 9, 1956  2 Sheets-Sheet 2

INVENTORS
ANDREW F. KAY
LEONARD M. SCHOLL
COVERT B. MEREDITH
BY

ATTORNEY

United States Patent Office 2,813,266
Patented Nov. 12, 1957

2,813,266

INDICATOR DEVICE AND MEANS FOR MOUNTING

Andrew F. Kay, Covert B. Meredith, and Leonard M. Scholl, San Diego County, Calif.; said Meredith and said Scholl assignors to said Kay Application January 9, 1956, Serial No. 557,941

6 Claims. (Cl. 340—378)

Our invention relates to an indicator or read-out device and to the means for mounting said device in a frame or panel. The invention is directed more particularly to the combination of the means for assembling the indicator device in a frame which facilitates repairs and replacement of light bulbs used in such read-out devices.

In order to more clearly explain the objects and advantages of our invention it will be necessary to describe an indicator or read-out device which may be used as a part of the combination and the principal use to which it is put.

One form of indicator device, more commonly called a "read-out" unit is composed of a plurality of preferably rectangular cells disposed in side-by-side relation, each cell having a front transparent window in order to read the indicators in each cell. The indicators comprise a plurality of plastic plates disposed in each cell parallel to the front window. Each plate is transparent and is formed with a symbol, such as the digits 1–0, etched into its surface.

A light source is disposed adjacent one edge of each plate which, when energized, causes the respective symbol to light up thereby indicating which light circuit is energized.

A common read-out unit, used in such devices as volt meters, will contain 4 or 5 cells. Each cell will contain the symbols of 1–0 plus a decimal point. It will therefore be necessary to have 44 to 55 or more light bulbs to operate the units.

The light bulbs must be crowded into a relatively small space so that the problem of connecting them into the circuits and of replacement becomes a serious one both from the cost of manufacture and the time and trouble involved in lamp replacement.

One of the objects of our invention is to provide a read-out unit of the type described and the combination of such unit with the means for mounting it which permits fast and inexpensive assembling and connecting into the respective electrical control circuit.

A further object of our invention is to provide means for mounting such a read-out unit which permits easy access to the light bulbs for replacement purposes.

Still another object of our invention is to provide the combination of a read-out unit and a cabinet or frame which automatically connects each light bulb into its respective circuit upon assembly of the unit into the cabinets.

It is also an object of our invention to provide mounting means which permits removal and replacement of individual light bulbs without the necessity of unsoldering any connections or disassembling any sockets or parts.

Other objects and advantages of our invention will become apparent from the description and the drawings thereof in which:

Fig. 1 is a fragmentary top plan view of one form of our invention.

Fig. 2 is a front elevation of the device shown in Fig. 1 and having portions of the front panel broken away.

Figure 3:
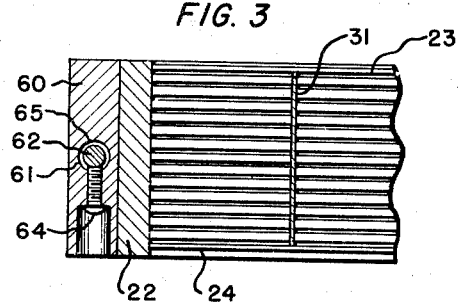
Fig. 3 is a fragmentary sectional view taken on line 3—3 of Fig. 2.

As will be seen by a reference to Figs. 1 and 2 we have provided a read-out unit designated generally by the numeral 10, mounted and disposed in a box or frame designated generally 11 and adjacent a front panel 12.

The front panel 12 is formed with an opening 14 which provides a window through which the windows of the read-out unit 10 may be viewed. It will be noted that the window 14 in substantially larger than the read-out unit 10. The reason for this will become apparent later.

In order to present a neat appearance a face plate 15 having a window 16 is secured to the front panel 12 in such position that the window 16 registers with read-out windows 17.

Face plate 15 is secured to front panel 12 by suitable fastening means such as screws 18 thereby permitting ready removal and access to read-out unit 10.

Figure 4:
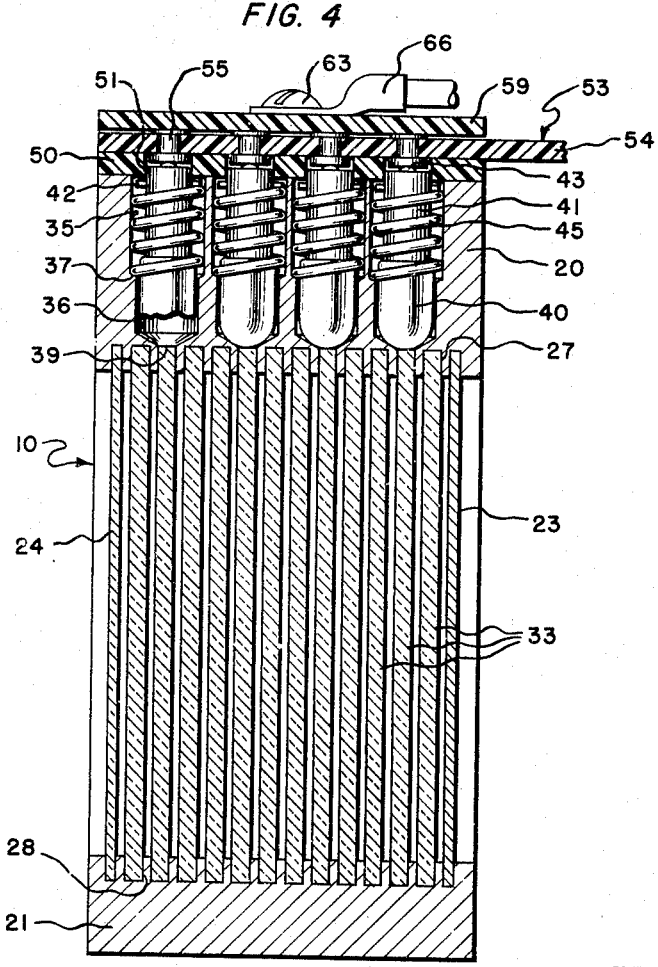
Fig. 4 is a fragmentary sectional view taken on line 4—4 of Fig. 2.

The read-out unit is composed of top and bottom plates 20 and 21, end plates 22, an opaque back 23 and a transparent front 24 (see Figs. 3 and 4) thereby forming a hollow box-like structure. The top and bottom plates are formed with tongues 25 and 26 respectively which fit into grooves 25a and 26a respectively of end plates 22. The top and bottom plates 20 and 21 are provided on their inner faces with a plurality of longitudinally extending, spaced, parallel grooves 27 and 28 respectively.

The top and bottom plates 20 and 21 are also formed with a plurality of spaced transverse grooves 30 (see Fig. 2) which receive opaque dividers 31 to divide the box-like structure into a plurality of individual light isolated cells.

A plurality of light responsive indicator signals such as transparent plates 33 are disposed in each cell and are retained in spaced parallel relation by means of the engagement of the upper and lower edges in corresponding grooves 27 and 28 respectively. Each of the plates 33 has engraved in its surface a symbol, such as the digits from 1–0. The plates are formed of light transmitting material, such as for example Lucite or Plexiglas which confines the light until it strikes an imperfection in the surface. Therefore light introduced at one edge of the panel 33 will cause the respective symbol to light up and be clearly visible.

The top plate 20 is formed with a plurality of bores 35 open at the top and having a reduced lower end portion 36 to thereby define a shoulder 37. The end portion 36 is further reduced or tapered at its lower end to form an aperture 39 through plate 20 into registry with one of the grooves 27.

A source of light, such as bulb 40, is disposed in the bore 35 which when energized edge lights the respective panel 33. The upper end of the bulb 40 is provided with a conductive base 41 having a rim 42 and an insulated contact 43. The two ends of the light filament (not shown) are connected to the metal base 41 and contact 43 respectively.

A compression spring 45 surrounds the base 41 and abuts against the shoulder 37 and flange 42 to thereby bias the bulb 40 upwardly and also to make an electrical connection between the shell 41 and plate 20.

Removably disposed on top of the plate 20 is a non-conductive guide plate 50 having a plurality of holes 51 in registry with the bores 35. The guide plate 50 not only insulates the flange 42 from the rivets 55 but also guides the contact 43 into contact with the rivets.

A circuit board, designated generally 53, is disposed above the guide plate 50 and is composed of an insulating plate 54 and a plurality of contacts, such as rivets 55. Each of said rivets is positioned in the plate 54 so that it contacts one of the light bulb contacts 43. Conductors such as etched copper lines 57 are electrically connected to each of the rivets 55. The circuit board 53 is securely mounted on the frame 11 by means of machine screws 58.

A stiffener plate 59 is placed on top of the circuit board 53 to prevent its bending upwardly under pressure from the biasing springs 45 to thereby assure a good contact between all of bulb contacts 43 and the respective rivet contacts 55 when the read-out unit 10 is in its up position.

A mounting block 60 is secured laterally to each end plate 22 and is formed with a vertically disposed bore 61. A vertically extending mounting rod 62 is slidably disposed through the bore 61 and is secured at its upper end by a machine screw 63 which extends through the stiffener plate 59, circuit board 53 and quick plate 50.

The read-out unit 10 is thereby permitted to move upwardly or downwardly on the rods 62 and may be removably held in its upper position by set screws 64. In order to assure against unwanted or accidental downward displacement of the read-out unit when it is desired to keep it in its upper position the rods 62 are formed with an annular groove 65 which receives the inner end of the set screws 64 when the read-out unit is in its upper contact position.

The read-out unit is grounded to one side of the electrical circuit by means of the rod 62, machine screw 63 and an electrical conductor terminal 66.

Thus it will be seen that in the event it is desired to replace one of the bulbs in the read-out unit, the screws 18 may be removed and the face plate 15 taken off. The set screws 64 are loosened and the read-out unit will then move downwardly to its lower position to expose the bulbs 40 which can then be readily replaced. After replacement, the read-out unit is moved upwardly until all of the contacts 43 are in contact with the respective rivets 55. The set screw 64 is then tightened and the face plate 15 replaced. Springs 45 bias the bulbs upwardly thereby maintaining a positive contact for each separate bulb.

Whereas the invention has been described in one of its embodiments, that is, as a multiple digit read-out unit for a direct reading digital volt meter, it is apparent that the invention is not so limited. The true scope of the invention encompasses indicator devices having a plurality of indicator means and to the means for mountng and assembling such indicator devices whereby the assembly means serves to automatically connect the indicator means into control circuits all of which is more clearly pointed out in the appended claims.

We claim:

1. In combination: a light responsive indicator device having a plurality of sockets on one surface thereof for receiving light producing means; electrically responsive light producing means disposed in each socket; biasing means for urging each said light producing means upwardly; a terminal board disposed in spaced relation to said surface and having a contact terminal in registry with each said socket for contacting each said light producing means; and means for holding said indicator device in contacting position whereby said light producing means are in electrical contact with respective contact terminals, said means comprising depending spaced parallel rods supported by said terminal board and means carried by said indicator device slidably disposed over each rod and adapted for locking engagement therewith.

2. In combination: a light responsive indicator device having a plurality of sockets on the upper surface thereof for receiving light producing means; electrically responsive light producing means disposed in each socket; resilient means associated with each said light producing means for biasing each said light producing means upwardly; a terminal board disposed in spaced relation to said surface and having an electrical contact terminal in registry with each said socket for contacting each said respective light producing means; and means for holding said indicator device in contacting position whereby said light producing means are in electrical contact with said contact terminals, said means comprising depending rods in spaced parallel relation supported at their upper ends by said terminal board and mounting blocks carried by said indicator device having a vertical bore therethrough for sliding engagement with said depending rods and having means for locking engagement with said rods.

3. Means for mounting an indicator device having electrical contacts extending outwardly from one surface thereof and for releasably electrically connecting said contacts into an electrical circuit comprising: a terminal board having a terminal for registry and contact with each of said electrical contacts; a pair of spaced parallel rods supported by said terminal board and depending therefrom; and a mounting block formed with a vertical bore therethrough carried at each end of said indicator device adapted for reciprocating engagement on said rods whereby said indicator device may be moved into or out of contact with said terminal board, said block having means for locking engagement with each respective rod.

4. In combination: a light responsive indicator device having a top plate formed with a plurality of sockets; light producing means disposed in each of said sockets and having an electrical terminal biased outwardly from said socket; a terminal board disposed in spaced relation from said top and having a contact terminal for registry with each of said light producing terminals and adapted for engagement therewith when said indicator device is moved to contact position; and means for permitting movement of said indicator device between contacting and open position, said last means comprising depending spaced parallel rods supported at their upper end by said terminal board, and means supporting said indicator device adapted for reciprocal sliding engagement with said rods and having means for locking engagement therewith, said supporting means and comprising spaced blocks each having a vertically disposed bore insert and a set screw intersecting said bore.

5. An indicator device comprising: a housing having a top plate, a bottom plate and end plates defining a box-like structure, said top plate being formed with a plurality of light bulb receiving sockets and an aperture communicating between each said socket and the interior of said box-like structures; a vertically disposed light responsive signal adjacent each said aperture in registry therewith whereby light entering through each said aperture causes said respective signal to become visible; a conductor supporting plate disposed superadjacent and in spaced parallel relation to said top plate and supporting a lamp contacting terminal in registry with each of said sockets; a guide plate disposed between said top plate and said conductor supporting plate and formed with a hole therethrough for registry with each of said sockets; each said end plate having a mounting block extending laterally therefrom formed with a vertically extending bore; supporting rods depending from and supported by said conductor supporting plate and spaced for reciprocal engagement in said mounting block bores; and means for locking said mounting blocks in predetermined position with respect to said rods.

6. An indicator device comprising: a housing having a top plate, a bottom plate and end plates defining a box-like structure, said top plate being formed with a plurality of sockets and an aperture communicating between each said socket and the interior of said box-like structures; light producing means disposed in each said socket; resilient means biasing each said light producing means outwardly; a vertically disposed light conducting plate having a symbol formed in one surface thereof adjacent each said aperture and having its upper edge in light transmitting registry therewith; a conductor supporting plate disposed in spaced parallel relation above said top plate and supporting a lamp contacting terminal for energizing each said light producing means when said housing is in up position; a guide plate disposed between said top plate and said conductor supporting plate and formed with a hole therethrough for registry with each of said sockets whereby each said light producing means is guided into contact with each respective contact terminal; each said end plate having a mounting block extending laterally therefrom, each said mounting block being formed with a vertically extending bore; supporting rods depending from and supported by said conductor supporting plate and spaced for reciprocal engagement in said mounting block bores; and set screw means for locking said mounting blocks in predetermined position with respect to said rods.

References Cited in the file of this patent

UNITED STATES PATENTS

| | | |
|---|---|---|
| 1,722,816 | Meunier | July 30, 1929 |
| 2,164,528 | Knotz | July 4, 1939 |
| 2,209,213 | Vernon | July 23, 1940 |
| 2,510,339 | Heiss | June 6, 1950 |
| 2,522,700 | Baker | Sept. 19, 1950 |

FOREIGN PATENTS

| | | |
|---|---|---|
| 14,302 | Great Britain | of 1911 |
| 368,254 | Italy | Feb. 11, 1939 |